United States Patent [19]

Von Derau et al.

[11] Patent Number: 4,778,545

[45] Date of Patent: Oct. 18, 1988

[54] METHOD AND APPARATUS FOR FORMING A FILLET

[75] Inventors: Frederic C. Von Derau, Woodinville; Michael G. Cavin, Federal Way, both of Wash.

[73] Assignee: The Boeing Company, Seattle, Wash.

[21] Appl. No.: 98,490

[22] Filed: Sep. 18, 1987

[51] Int. Cl.$^4$ ............................................. B32B 1/00
[52] U.S. Cl. ..................................... 156/64; 156/201; 156/204; 156/324; 156/353; 156/360; 156/378
[58] Field of Search ................. 156/64, 378, 201, 204, 156/353, 360, 350; 83/73

[56] References Cited

U.S. PATENT DOCUMENTS

| | | | |
|---|---|---|---|
| 4,151,031 | 4/1979 | Good et al. | 156/201 X |
| 4,328,050 | 5/1982 | Ashizawa et al. | |
| 4,533,286 | 8/1985 | Kishi et al. | |
| 4,554,635 | 11/1985 | Levine | |
| 4,559,005 | 12/1985 | Gants et al. | 425/363 |
| 4,589,062 | 5/1986 | Kishi et al. | |

Primary Examiner—David Simmons
Attorney, Agent, or Firm—Seed and Berry

[57] ABSTRACT

A method and apparatus for forming a fillet to fill a void between two L-shaped structural members which reinforce a composite material skin. A leg of one of the structural members is placed against a leg of the other member, with the second legs of the two members extending outwardly from the adjacent legs. The void is formed between the adjacent rounded outer edges between the legs of each of the members. The apparatus measures the radii of curvature of each of the rounded edges along the length of the member, stores the radii data in an electronic memory, and calculates the area of the void as a function of length along the member. The apparatus then controls a knife to trim an edge from a composite tape so that the trimmed tape has a cross-sectional area equal to the area of the void. The apparatus then forms the fillet from the trimmed tape.

17 Claims, 3 Drawing Sheets

METHOD AND APPARATUS FOR FORMING A FILLET

STATEMENT OF GOVERNMENT INTEREST

The Government has rights in this invention.

TECHNICAL FIELD

This invention relates to a method and apparatus for forming a fillet, and more particularly, to a method and apparatus for determining the cross-sectional area of a void to be filled by the fillet, as a function of length.

BACKGROUND ART

Composite material skins are conventionally supported by a reinforcing member made from two or more elongated L-shaped structural members each having a pair of legs separated by a rounded bend. L-shaped members are secured to each other with one leg of a member extending along one leg of the other member and the remaining legs projecting away from each other. When a pair of structural members are connected in this manner, a void is formed between the adjacent rounded corners of the combined structural members. This void is typically filled with a fillet and the resulting structure attached to the composite material skin.

As disclosed in U.S. Pat. No. 4,559,005 by Gants et al., and assigned to the assignee of the present invention, it is known to form a composite material into a fillet intended to fill the void between two L-shaped structural members when the two structural members have a constant cross section. However, when the size of the void varies along the length of the combined members, the fillet can be too small or too large.

If the fillet is too small, voids will be created between the reinforcing member and the skin, and will result in a weaker reinforcement than intended. If the fillet is too small, the excess fillet material will squeeze out of the gap between the structural members and cause a poor fit between the skin and the supporting member. Either of these problems may cause the reinforced skin part to fail a quality control inspection and waste valuable composite parts.

DISCLOSURE OF THE INVENTION

It is an object of the present invention to provide an apparatus that forms fillets by taking into account variations in structural members used to reinforce composite material skins.

It is another object of the present invention to provide an apparatus that measures and collects data regarding the structural members used to reinforce a composite material skin, in order to calculate the size of the void formed therebetween.

It is yet another object of the present invention to provide an apparatus that trims a tape to form a fillet which fits into the void between structural members used to reinforce a composite material skin.

It is a still further object of the present invention to provide a method for forming a varying elongated fillet intended to be placed in the void between the structural members used to reinforce a composite material skin.

According to one aspect, the present invention provides an apparatus for specifying the width of a tape to be used as an elongated fillet. The fillet fills the void between adjacent rounded outer edges of a plurality of lengthwise abutting structural members. The apparatus comprises sensor means for determining the radius of curvature of the adjacent rounded outer edges of each of the structural members as a function of lengthwise position along the structural member. It also includes an electronic memory for storing the measurements. Further, it includes a processing unit programmed to calculate the cross-sectional area of the void from the stored measurements and to specify the width of tape required to provide the calculated cross-sectional area.

In another aspect, the apparatus comprises measurement means for separately determining the radius of curvature of the adjacent rounded outer edges of each of two structural members as a function of lengthwise position along each structural member. The two sets are correlated as functions of lengthwise position along each structural member. The apparatus further comprises an electronic memory for storing the two correlated sets of measurements, a processing unit programmed to calculate the cross-sectional area of the void as a function of lengthwise position along the structural members from the correlated stored sets of measurements. In addition, the apparatus includes cutting means for trimming an edge from the composite material tape. The cross-sectional area of the resulting trimmed tape is substantially equal to the cross-sectional area of the void as a function of length along the tape. Further, the apparatus consists of means for forming a fillet of uncured composite material from the trimmed tape and means for reinforcing the composite material skin by placing the uncured fillet between the adjacent rounded edges of the two L-shaped structural members, adhering the structural members to the composite material skin, and curing the fillet.

In a further aspect, the invention includes a method for specifying the width of a tape to be used as an elongated fillet to fill a void between adjacent rounded outer edges of a plurality of lengthwise abutting structural members. The method comprises the steps of determining the radius of curvature of the adjacent rounded outer edges of each of the plurality of structural members as a function of lengthwise position along each structural member, storing the radii in an electronic memory, calculating the cross-sectional area of the void as a function of lengthwise position along the structural members, from the stored measurements, and specifying the width of the tape as a function of lengthwise position along the structural members to be proportional to the calculated cross-sectional area of the void.

BEST MODE FOR CARRYING OUT THE INVENTION

Figure 1:
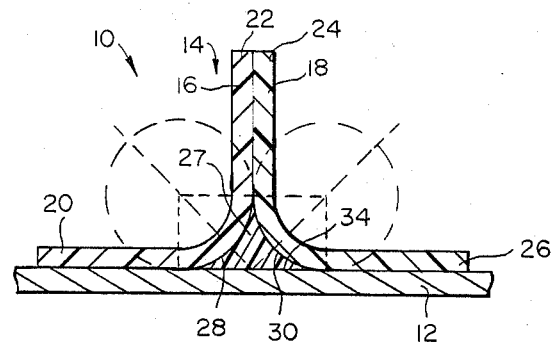
FIG. 1 is a schematic diagram of the geometry of the void between two L-shaped structural members that are used to reinforce a composite material skin.
Figure 5A:
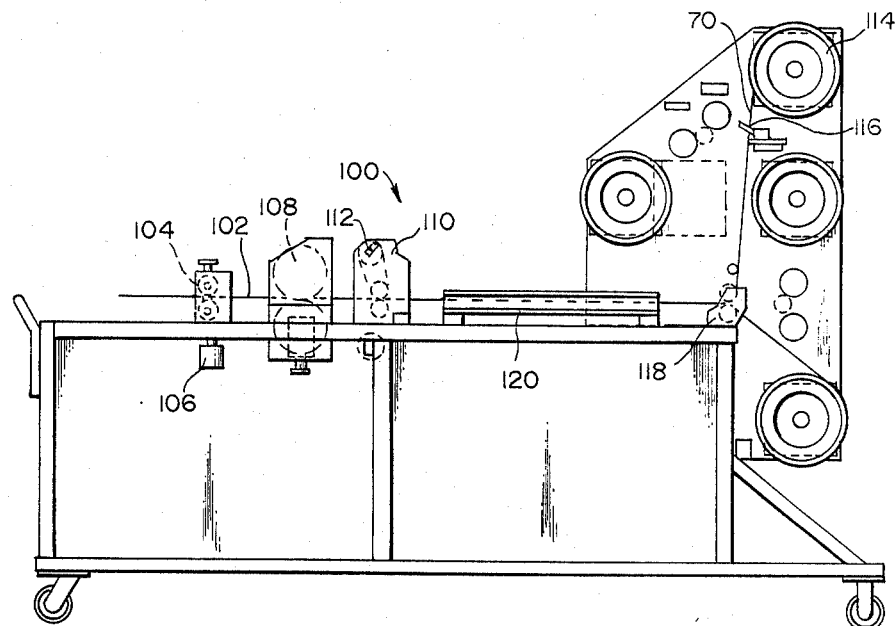
FIGS. 5A and 5B are side and plan views of one embodiment of the apparatus for trimming the tape and forming the fillet therefrom.
Figure 5B:
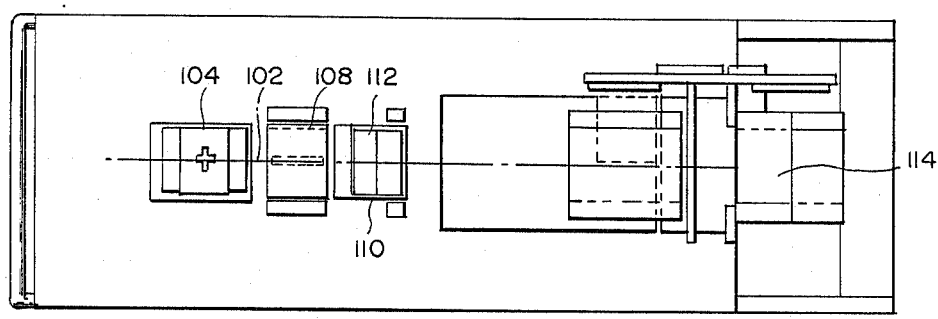

Referring to FIG. 1, a reinforced composite material skin structure 10 includes a composite material skin 12 and a reinforcing structure 14. Reinforcing structure 14 includes two L-shaped elongated structural members 16 and 18, although it is apparent that reinforcing structure 14 can be made from more that two structural members. While structural members 16 and 18 are both shown to have ninety degree angles between their respective legs, 20-22 and 24-26 the legs may, in some applications, advantageously include other angles, so long as the sum of their angles is one hundred eighty degrees so that the structural members' legs which are to be attached to the skin will fit properly against the skin. When more than two structural members are used to make up reinforcing structure 14, the included angles of the component structural members must equal one hundred eighty degrees.

The structural members 16 and 18 are made from a composite material that is galvanically compatible with the material from which composite material skin 12 is made, in order to prevent deterioration of the reinforcing structure 14 due to galvanic currents. Graphite/epoxy, composed of a graphite fabric impregnated by a thermosetting epoxy resin is a particularly advantageous material. Accordingly, in most applications, it is preferable that both the skin 12 and the reinforcing structure 14 be made from a graphite/epoxy composite.

For optimum strength and shape of the resulting reinforced skin, the void 27 is preferably completely filled with a fillet of a composite material that is compatible with the material of members 16 and 18 and of skin 12. As illustrated in U.S. Pat. No. 4,559,005, it is known how to prepare a fillet from a graphite epoxy material which has the correct cross-sectional area and shape to fit into the void 27.

It is generally intended that the structural components that make up the reinforcing structure 14 are of constant cross section as a function of lengthwise position. Specifically, the outer rounded edges 28 and 30, positioned respectively between legs 20-22 and legs 24-26, are intended to be quarter circles of constant radius. If their radius is constant, the area of the void 27 formed between the upper surface 34 of the skin 12 and the outer rounded edges 28 and 30 can be calculated precisely for the entire length of the reinforcing structure 14.

In practice it has been found that the outer rounded edges 28 and 30 do not have constant radii of curvature as functions of length down the structural members. This variance causes a constant area fillet made according to the apparatus of the prior art to be occasionally too large or too small for the cross-sectional area of the void 27. The result is that the skin 12 can be warped by the excess fillet material or a gap can be created between the structural members 16 and 18, reducing the strength of the resulting panel. Either of these faults can be so severe as to cause the reinforced skin structure, which is made from expensive composite material parts, to fail quality control tests. Since these faults cannot typically be corrected after the thermosetting resin has set, the reinforced structure must be scrapped, at great expense.

It is clear that, even in the case where the radii of curvature of the outer rounded edges of the two structural members 16 and 18 are not constant, the area of the void 27 can be calculated from their geometry. The geometry of the outer rounded edges is determined solely by their radii of curvature. Therefore, by measuring the radii of curvature of the structural members 16 and 18 as functions of their length, it is possible to calculate the area of the void 27 along the length of the reinforcing structure 14.

The area of the void 27 is given by $A_v = (R_1^2 + R_2^2)(1 - pi/4) = 0.2146 (R_1^2 + R_2^2)$, where $R_1$ and $R_2$ are the radii of curvature of structural members 16 and 18, respectively. This formula can be programmed into a computer and used to evaluate the cross-sectional area of the void 27, given the values of the radii of curvature as functions of the length of the structural members.

Figure 2:
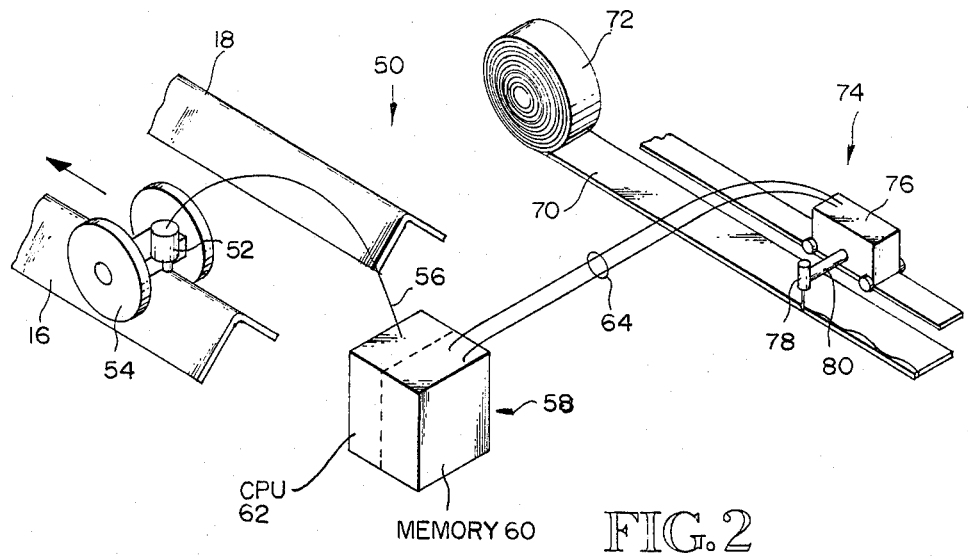
FIG. 2 is a schematic diagram of one embodiment of the apparatus that will measure the structural members, store the measurements, calculate the area of the void between the structural members, and trim a tape to be used to form a fillet to fill the void.

Referring to FIG. 2, apparatus for measuring and storing the radii of curvature, calculating the corresponding void area, and trimming a composite material tape accordingly is diagrammed schematically. The apparatus 50 includes a proximity sensor 52 for making a measurement which determines the radius of curvature of a structural member, such as members 16 and 18. The proximity sensor 52 includes a length sensor 54 for measuring the distance travelled by proximity sensor along the length of the structural member. The proximity and length data collected by the proximity sensor 52 are fed over the cable 56 to the computer 58. Computer 58 includes an electronic memory (such as random access memory) 60 and a programmable central processing unit (CPU) 62. An exemplary computer is the IPC 2001, made by Texas Microsystems, Incorporated. The CPU 62 (for example, an Intel 8086) can be programmed to sample the data provided by the proximity sensor 52, to store and retrieve data from electronic memory 60, and to perform calculations on the data. Therefore, the computer 58 can receive the proximity and length data provided by the proximity sensor 52, apply the formula above to determine the corresponding area of the void 27 and store the results in the memory 60. In some embodiments, it may be desirable to collect the proximity and length data for one structural member at a time, storing the data separately in the electronic memory 60, and then later using the computer to correlate the stored data and apply the formula for the area of the void. In other embodiments, it may be desirable to measure the radii of curvature of both structural members simultaneously and apply the formula to the data as they are produced. In still other embodiments, it may be desirable to store the radius of curvature data pertaining to one structural member and later measure the radius of curvature of the other structural member, while correlating the already stored data to the current measurement. The area of the void can then be calculated concurrently with collecting the radius of curvature data from the last structural member.

As further shown in FIG. 2, the computer 58 can act as a controller for the purpose of trimming a tape 70. The tape 70 can be supplied in a roll 72 and positioned in a cutter 74 that trims one or both edges of the tape. In one embodiment, the cutter 74 can receive length and area signals from the computer and, in response thereto, control the lengthwise position of a trolley 76 that controls the longitudinal position of a trim knife 78, and an arm 80 controlling the transverse position of the trim knife. Arm 80 can, for example, be an electric linear actuator. The trim knife trims an edge from the tape 70 so that the cross-sectional area of the trimmed tape is proportional to the area of the void 27, as functions of length along the tape. If the tape 70 is preimpregnated with the resin, the area of the tape can be trimmed to be equal to the area of the void. However, if preimpregnated tape is not used, a proportionality factor must be used to account for the added area resulting when the resin is added to the tape.

In a typical application, the radii of curvature of the structural members 16 and 18 may be 0.25 and 0.27 inch, respectively. The area of the void 27, according to the formula is 0.029057 square inches. If the tape is a preimpregnated tape having a thickness of 0.004 inch, the width of the tape should be (0.029057/0.004)=7.2642 inches. If the variations of the radii of curvature never exceed 0.273 inch, a tape having an untrimmed width of eight inches will be larger enough to account for all variations in the structural members.

Figure 3:
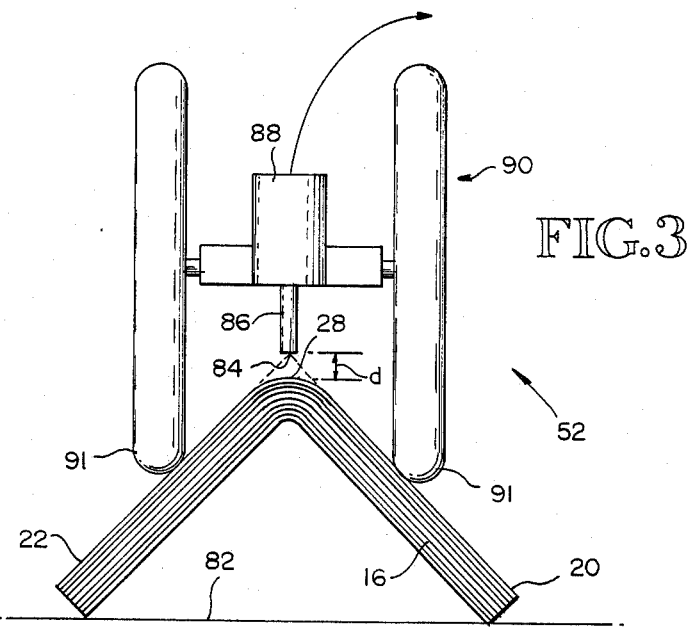
FIG. 3 is a close-up view, in partial cross section, of the means for determining the radius of curvature of the rounded outer edges of each of the structural members used to reinforce the composite material skin.

FIG. 3 is a closeup of the proximity sensor 52. A structural member, such as member 16 is placed on a surface 82, with the rounded edge 28 facing upward. The radius of curvature of the structural member can be determined by measuring the deviation of the rounded edge 28 from the point 84. Point 84 is the theoretical center of curvature of the rounded edge 28, if the rounded edge had a radius of curvature of zero. In other words, point 84 is determined as the intersection of the straight lines extending along surfaces 20 and 22. From basic geometry, it can be established that the radius of curvature of the outer rounded edge 28 is given by $R=d/0.4142$, where d is the proximity distance from point 84 to the outer rounded edge.

The distance d can be measured by a measurement sensor 86 which may, for example, operate on ultrasonic principles. One possible measurement sensor is the analog sensor produced by the Turck Company, although other sensors, operating on other principles can also be used for this purpose. In some applications, it may not be possible to place the measurement head 88 of the measurement sensor 86 exactly at the point 84. In this case, a known offset distance can be established and compensated for by the computer 58.

The longitudinal position of the proximity sensor 52 can be established by mounting the measurement sensor 86 on a length sensor 90 such as that shown in FIG. 3. Length sensor 90 can comprise a pair of wheels adapted to roll along the surfaces of the legs 20 and 22. Attached to at least one of the wheels 91 is an optical coding disk (not shown) which produces electrical pulses uniformly with distance along the structural member 16. Wheels 91 can be made from a non-slip material so that the length measurements provided by the length sensor 90 are accurate. One such length sensor is produced by the LSC Company. Of course, a variety of analog or constant-velocity sensors can be used in this application, as well. It has been determined that data samples taken approximately every one inch along the length of the structural member is adequate to provide a very close approximation to the distribution of the cross-sectional area of the void 27 as a function of length.

Figure 4:
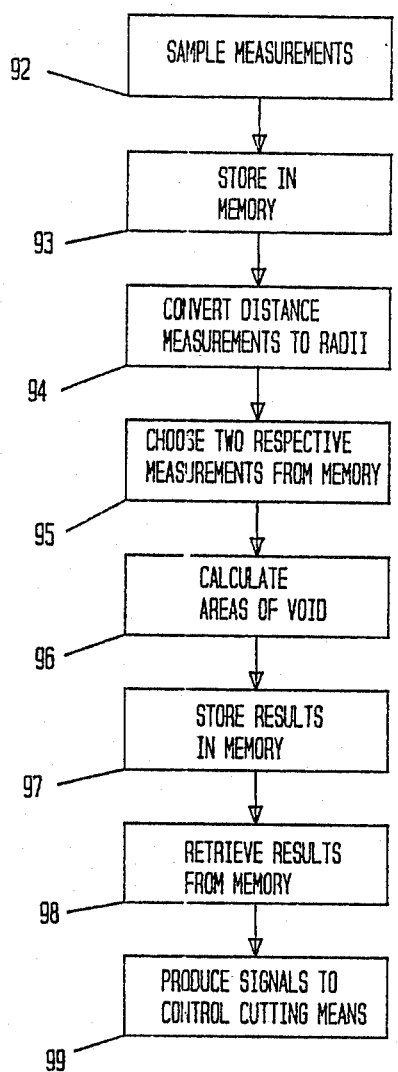
FIG. 4 is a flow chart of a program that can be used to control the operation of the processing unit of the invention.

FIG. 4 is a flow chart of a program that can be used by the central processing unit 62 (see FIG. 2) to receive measurements, calculate data, and control the cutting means for making the fillet. Starting with block 92, the computer program causes the CPU to sample the measurements made by the proximity sensor 52 and the length sensor 54. In one embodiment, the computer can be programmed to monitor the signal developed by the length sensor 54. When the length sensor produces a signal that signifies that the proximity sensor 52 has travelled another predetermined increment in length, the CPU 62 samples the reading then being produced by the proximity sensor. In other embodiments, the length sensor 54 can be sampled periodically to determine whether it has travelled an additional length increment and, when it has, samples of both the proximity sensor 52 and the length sensor 54 can be taken by the CPU 58.

The samples taken are stored in the electronic memory 60 (e.g., a RAM), as shown in block 93. In some embodiments, where the data from one structural member are sampled before another structural member is measured, the sample and store steps represented by blocks 92 and 93 may be performed for the set of data describing one structural member and then for the set describing another. Regardless of the order in which they are obtained, the stored samples should next be converted into equivalent radii of curvature (block 94).

In order to calculate the area of the void at a particular position along the structural members, the measurements of the radii of curvature must be correlated. If the radius data are sampled simultaneously, the data can be inherently correlated by storing them in adjacent locations in memory 60. If, however, the radius data are sampled separately, they must be stored in an order which allows their correlation to be established.

Depending upon how this correlation is accomplished, it is necessary to correctly calculate the area of the void. As shown in block 95, the next step in the computer program is to choose correlated radius measurements from the electronic memory 60, and then to calculate the areas of the void for the particular correlated radius measurements (block 96). The results of these calculations can be stored in electronic memory (block 97). In other embodiments, where the cutting apparatus is prepared to act on the data as they are produced, the steps represented by blocks 97 and 98 can be omitted. Otherwise, the results stored in the program step represented by block 97 must be retrieved when the cutting apparatus has been prepared for operation (block 98). Finally, when the cutting apparatus is ready, the area results stored and retrieved in steps represented by blocks 97 and 98 are used to produce signals that control the cutting means. In some embodiments of the apparatus, the signals can be both length and transverse displacement signals, while in others, only transverse signals will be needed.

Side and plan views of an embodiment of the apparatus for trimming the composite material tape and forming the fillet are shown in FIGS. 4A and 4B. Under control of data received from the computer 58 over the signal lines 64, tape trimming and fillet forming apparatus 100 causes a fillet 102 to be pulled through the apparatus 100 by pull roller assembly 104, which includes a drive motor 106. The shape of fillet 102 is formed in foam roller assembly 108 after it has been wrapped in a pull tape by pull tape dispenser 110. The pull tape is supplied by pull tape roll 112.

The composite tape which is formed into fillet 102 by apparatus 100 is supplied by composite tape roll 114, which can be supplied in any convenient width for the application at hand. The composite tape 70 is pulled from composite tape roll 114 by the force supplied by pull roller assembly 104. The composite tape is pulled longitudinally past a cutting tool 116 (such as a sharp blade or an ultrasonic trim knife manufactured by Branson Ultrasonics Corporation) which translates according to the commands received over the signal lines 64 (see FIG. 2) to give the tape 70 the proper width. If the composite tape 70 is supplied with a backing paper, it is stripped off by stripper assembly 118 before passing to rope maker 120. Details of operation of a rope maker such as rope maker 120 are provided in U.S. Pat. No. 4,559,005.

While various preferred embodiments of the invention have been disclosed in the foregoing, one skilled in the art will readily appreciate that various modifications of the above-described embodiments may be made without departing from the spirit and the scope of the invention. Accordingly, the spirit and the scope of the present invention are to be limited only by the following claims.

We claim:

1. An apparatus for specifying the width of a tape to be used as an elongated fillet to fill a void between adjacent rounded outer edges of a plurality of lengthwise abutting structural members, comprising:
    sensor means for making measurements that determine the radius of curvature of the adjacent rounded outer edges of each of the structural members as a function of lengthwise position along the structural member;
    an electronic memory for storing the measurements; and
    a processing unit programmed to calculate the cross-sectional area of the void from the stored measurements and to specify the width of tape required to provide the calculated cross-sectional area, both as functions of lengthwise position along the tape.

2. The apparatus of claim 1 wherein the processing unit is further programmed to store the specified widths of tape in the electronic memory.

3. The apparatus of claim 1, further comprising cutting means for trimming at least one edge from the tape, the cross-sectional area of the resulting trimmed tape being proportional to the cross-sectional area of the void as a function of length along the tape.

4. The apparatus of claim 3 wherein the measurement means measures the radius of curvature of each of the structural members separately and the cutting means trims the tape as the radius of curvature measurements are made on the last structural member to be measured.

5. An apparatus for specifying the width of a tape to be used as an elongated fillet to fill a void between adjacent rounded outer edges of two lengthwise abutting structural members, comprising:
    sensor means for making measurements that determine the radius of curvature of the adjacent rounded outer edges of each of the structural members as a function of lengthwise position along the structural member;
    an electronic memory for storing the measurements; and
    a processing unit programmed to calculate the cross-sectional area of the void from the stored measurements and to specify the width of tape required to provide the calculated cross-sectional area, both as functions of lengthwise position along the tape.

6. An apparatus for forming an elongated fillet from a composite material tape made from a matrix material preimpregnated with uncured thermosetting resin, the fillet to be used to fill a void between adjacent rounded outer edges of a plurality of lengthwise abutting structural members made from the composite material, comprising:
    sensor means for making measurements that determine the radius of curvature of the adjacent rounded outer edges of each of the plurality of structural members as a function of lengthwise position along each structural member;
    an electronic memory for storing the measurements;
    a processing unit programmed to calculate the cross-sectional area of the void from the stored measurements;
    cutting means for trimming at least one edge from the tape of composite material, the cross-sectional area of the resulting trimmed tape being substantially equal to the cross-sectional area of the void as a function of length along the tape; and
    means for forming the fillet from the trimmed tape.

7. The apparatus of claim 6 wherein the measurement means is an ultrasonic proximity sensor.

8. The apparatus of claim 6 wherein the cutting means is an ultrasonic trim knife adapted to be moved transversely and longitudinally to the length of the tape under the control of the processing unit.

9. An apparatus for forming an elongated fillet from a composite material tape made from a matrix material preimpregnated with uncured thermosetting resin, the fillet to be used to fill a void between adjacent rounded outer edges of two lengthwise abutting structural members made from the composite material, comprising:
    measurement means for making separate measurements that determine the radius of curvature of the adjacent rounded outer edges of each of the two structural members as a function of lengthwise position along each structural member, thereby creating respective sets of measurements, correlated as functions of lengthwise position along each structural member;
    an electronic memory for storing the two correlated sets of measurements;
    a processing unit programmed to calculate the cross-sectional area of the void from the correlated stored sets of measurements as a function of lengthwise position along the structural members;
    cutting means for trimming an edge from the composite material tape, the cross-sectional area of the resulting trimmed tape being substantially equal to the cross-sectional area of the void as a function of length along the tape; and
    means for forming the fillet of composite material from the trimmed tape.

10. An apparatus for forming an elongated fillet from a composite material tape made from a graphite cloth preimpregnated with an uncured epoxy, the fillet to be used to fill a void between the adjacent rounded outer edges of two lengthwise abutting structural members made from cured graphite/epoxy material, comprising:
    an ultrasonic measurement sensor for making proximity measurements that determine the radius of curvature of the adjacent rounded outer edges of each of the two structural members as a function of incremental lengthwise position along each structural member, thereby creating a set of proximity measurements for each of the two structural members;
    an electronic memory for storing the proximity measurements;

a processing unit programmed to calculate the cross-sectional area of the void from the stored correlated sets of proximity measurements as a function of incremental lengthwise position along the structural members;

an ultrasonic trim knife moving transversely and longitudinally to the length of the tape under the control of the processing unit for trimming an edge from the tape of composite material, the cross-sectional area of the resulting trimmed tape being substantially equal to the cross-sectional area of the void as a function of incremental lengthwise position along the tape; and means for forming the fillet of composite material from the trimmed tape.

11. The apparatus of claim 10 wherein the ultrasonic measurement sensor comprises an ultrasonic proximity sensor mounted on a measuring wheel length sensor adapted to ride along the rounded outer edges of the structural members.

12. The apparatus of claim 11 wherein the measuring wheel length sensor comprises an optical encoder disk attached to at least one wheel, the at least one wheel being adapted to roll lengthwise along the structural members.

13. An apparatus for reinforcing a composite material skin with two L-shaped elongated structural members made from the composite material, a leg from one of the two structural members being held in lengthwise abutment against a leg from the other, the rounded outer edges of each of the two structural members being adjacent one another and defining a void therebetween, the apparatus comprising:

measurement means for separately measuring the radius of curvature of the adjacent rounded outer edges of each of the two structural members as a function of lengthwise position along each structural member, thereby creating two respective sets of measurements correlated as functions of lengthwise position along each structural member;

an electronic memory for storing the two correlated sets of measurements;

a processing unit programmed to calculate the cross-sectional area of the void from the correlated stored sets of measurements, as a function of lengthwise position along the structural members;

cutting means for trimming an edge from the composite material tape, the cross-sectional area of the resulting trimmed tape being substantially equal to the cross-sectional area of the void as a function of length along the tape;

means for forming a fillet of uncured composite material from the trimmed tape; and means for reinforcing the composite material skin by placing the uncured fillet between the adjacent rounded edges of the two L-shaped structural members, adhering the structural members to the composite material skin, and curing the fillet.

14. A method for specifying the width of a tape to be used as an elongated fillet to fill a void between adjacent rounded outer edges of a plurality of lengthwise abutting structural members, comprising the steps of:

(a) determining the radius of curvature of the adjacent rounded outer edges of each of the plurality of structural members as a function of lengthwise position along each structural member;

(b) storing the radii in an electronic memory;

(c) calculating the cross-sectional area of the void as a function of lengthwise position along the structural members, from the stored measurements; and (d) specifying the width of the tape as a function of lengthwise position along the structural members to be proportional to the calculated cross-sectional area of the void.

15. A method for forming an elongated fillet from a composite material tape made from a matrix material preimpregnated with uncured thermosetting resin, the fillet to be used to fill a void between adjacent rounded outer edges of a plurality of lengthwise abutting structural members made from the composite material, comprising the steps of:

(a) determining the radius of curvature of the adjacent rounded outer edges of each of the two structural members as a function of lengthwise position along each structural member;

(b) storing the radii in an electronic memory;

(c) calculating the cross-sectional area of the void as a function of lengthwise position along the structural members, from the stored measurements;

(d) trimming an edge from the tape of composite material, the cross-sectional area of the resulting trimmed tape being substantially equal to the area of the void as a function of length along the tape; and (e) forming the fillet of composite material from the trimmed tape.

16. A method for forming an elongated fillet from a tape of composite material, the fillet to be used to fill a void between adjacent rounded outer edges of two abutting elongated structural members made from the composite material, comprising the steps of:

(a) determining the radius of curvature of the adjacent rounded outer edges of each of the two structural members as a function of lengthwise position along each structural member;

(b) storing the radii in an electronic memory;

(c) correlating the radii as a function of lengthwise position along the structural members;

(d) calculating, from the stored radius of curvature measurements, the cross-sectional area of the void as a function of lengthwise position along the structural members;

(e) trimming an edge from the tape of composite material, the cross-sectional area of the resulting trimmed tape being substantially equal to the area of the void as a function of length along the tape; and (f) forming the fillet of composite material from the trimmed tape.

17. A method for reinforcing a composite material skin with two L-shaped elongated structural members made from the composite material, a leg from one of the two structural members being held in lengthwise abutment against a leg from the other, the rounded outer edges of each of the two structural members being adjacent one another and defining a void therebetween, the method comprising the steps of:

(a) separately determining the radius of curvature of the adjacent rounded outer edges of each of the two structural members as a function of lengthwise position along each structural member thereby creating two respective sets of measurements correlated as functions of lengthwise position along each structural member;

(b) storing the radii in an electronic memory;

(c) calculating, from the stored measurements, the cross-sectional area of the void as a function of lengthwise position along the structural members;

(d) trimming an edge from the tape of composite material, the cross-sectional area of the resulting trimmed tape being substantially equal to the area of the void as a function of length along the tape;

(e) forming a fillet of the uncured composite material from the trimmed tape;

(f) placing the uncured fillet between the adjacent rounded edges of the two L-shaped structural members;

(g) adhering the structural members and the fillet to the composite material skin; and (h) curing the fillet.

* * * * *